United States Patent [19]
Culver

[11] Patent Number: 4,724,715
[45] Date of Patent: Feb. 16, 1988

[54] CONTROL MECHANISM FOR COMPUTER KEYBOARD AND THE LIKE

[76] Inventor: Craig F. Culver, 201 Ware Rd., Woodside, Calif. 94062

[21] Appl. No.: 857,886

[22] Filed: Apr. 30, 1986

[51] Int. Cl.⁴ ............................................. G05G 9/02
[52] U.S. Cl. .................... 74/471 R; 74/471 XY; 340/710
[58] Field of Search .............. 74/471 R, 471 XY, 206; 340/347 P, 347 M, 710; 338/123, 132, 133

[56] References Cited

U.S. PATENT DOCUMENTS

| | | | |
|---|---|---|---|
| 3,823,616 | 7/1974 | Houseman et al. | 74/471 R |
| 4,369,439 | 1/1983 | Broos | 340/710 |
| 4,537,084 | 8/1985 | Dassemard et al. | 74/471 XY X |
| 4,544,915 | 10/1985 | Wieme et al. | 340/347 M X |
| 4,562,347 | 12/1985 | Hovey et al. | 74/471 XY X |

OTHER PUBLICATIONS
"Engineering News", *Machine Digest*, 7-6-1961.

*Primary Examiner*—Randolph A. Reese
*Assistant Examiner*—Joseph A. Fischetti
*Attorney, Agent, or Firm*—Thomas S. MacDonald; Alan H. MacPherson; Paul J. Winters

[57] ABSTRACT

A control mechanism for generation of a pair of analog signals wherein the mechanism includes a support and an analog element mounted on the support for rotation and translation relative thereto. The support includes an elongated guide member, and the analog element is rotatably mounted on the guide member and is movable relative to and longitudinally of the guide member. A first encoder is coupled to the analog element for sensing rotation thereof relative to the support. A second encoder is coupled with the analog element for sensing translation of the analog element relative to the support. Several embodiments of the control mechanism are disclosed.

22 Claims, 21 Drawing Figures

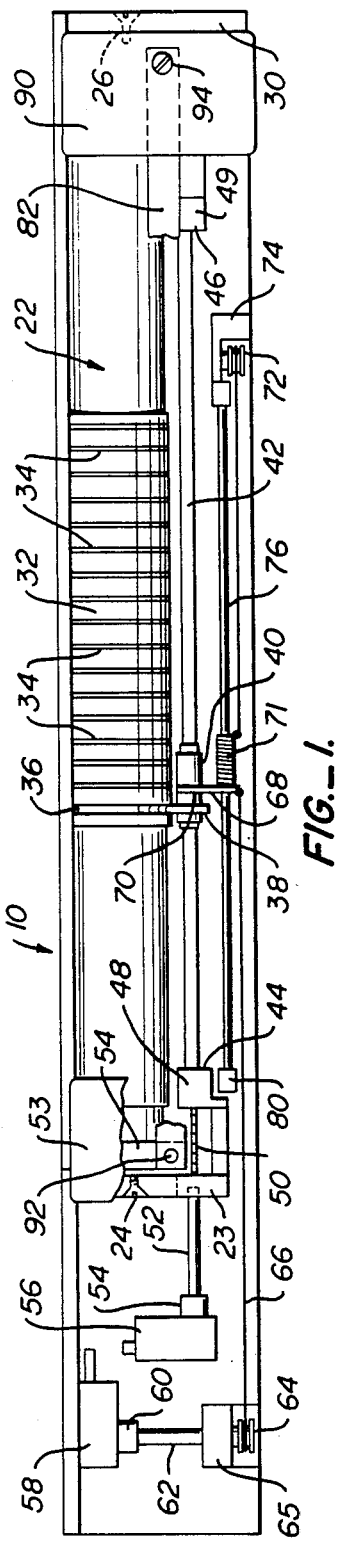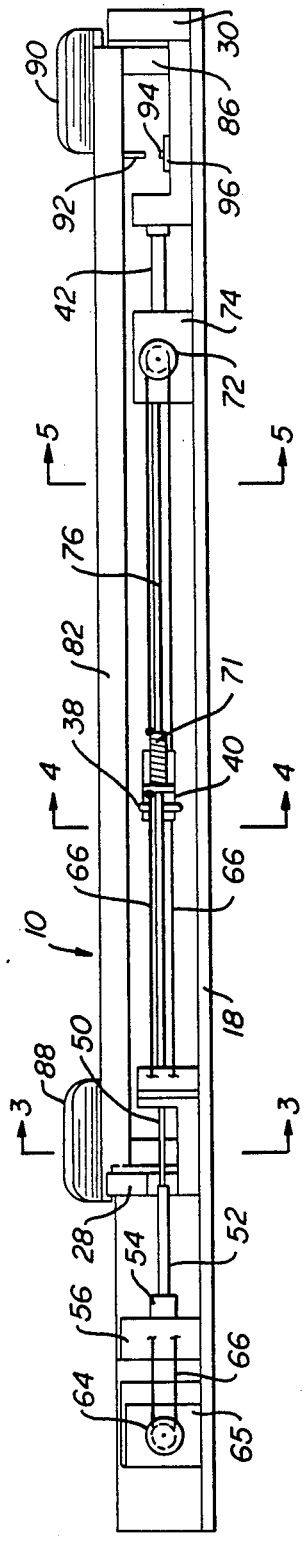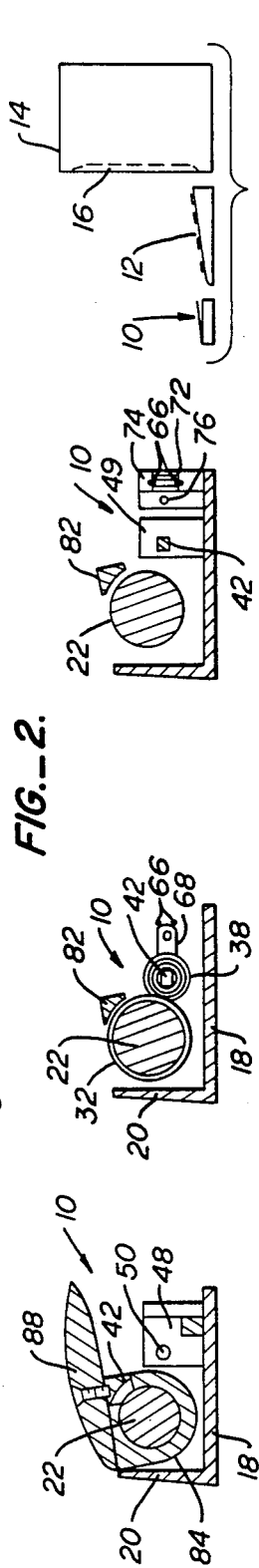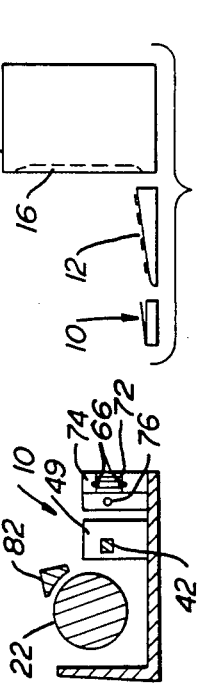

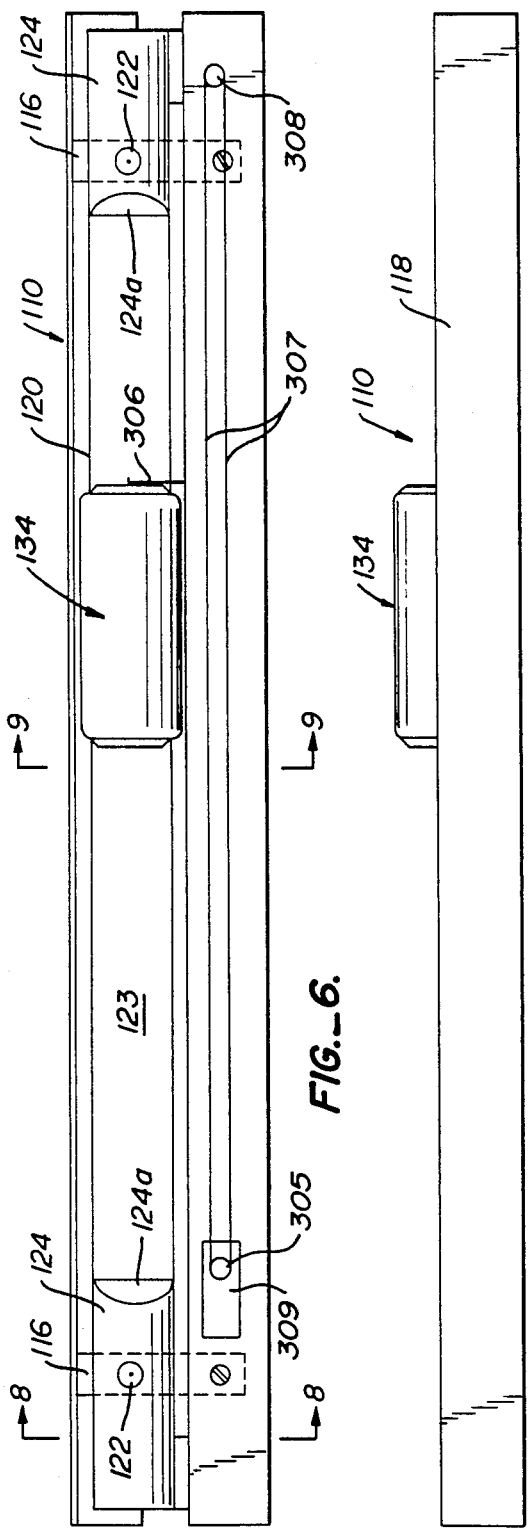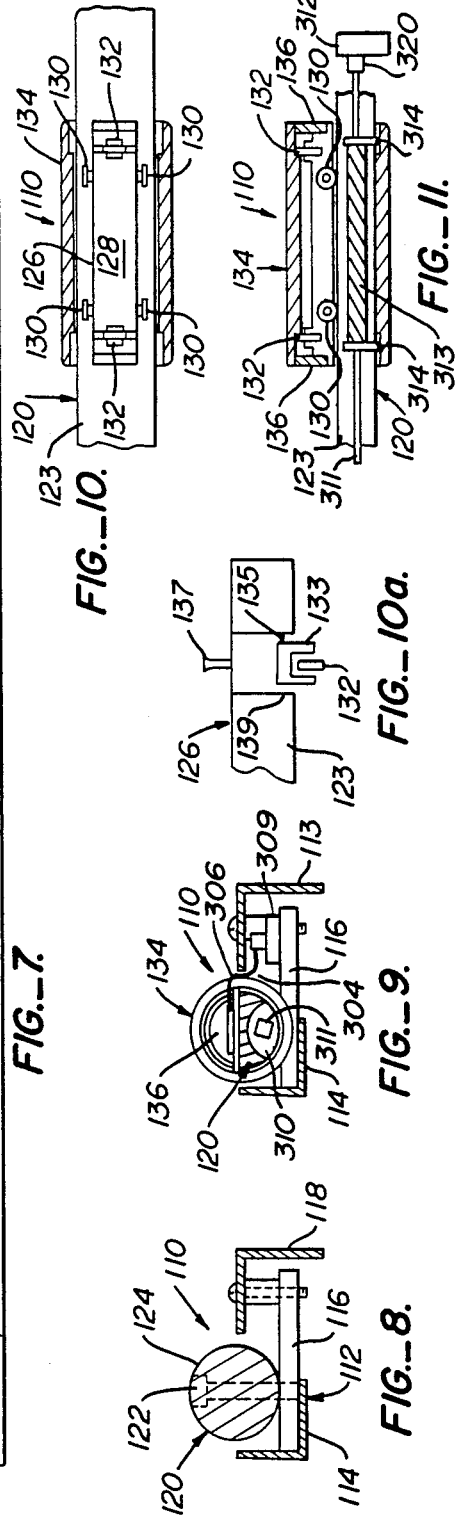

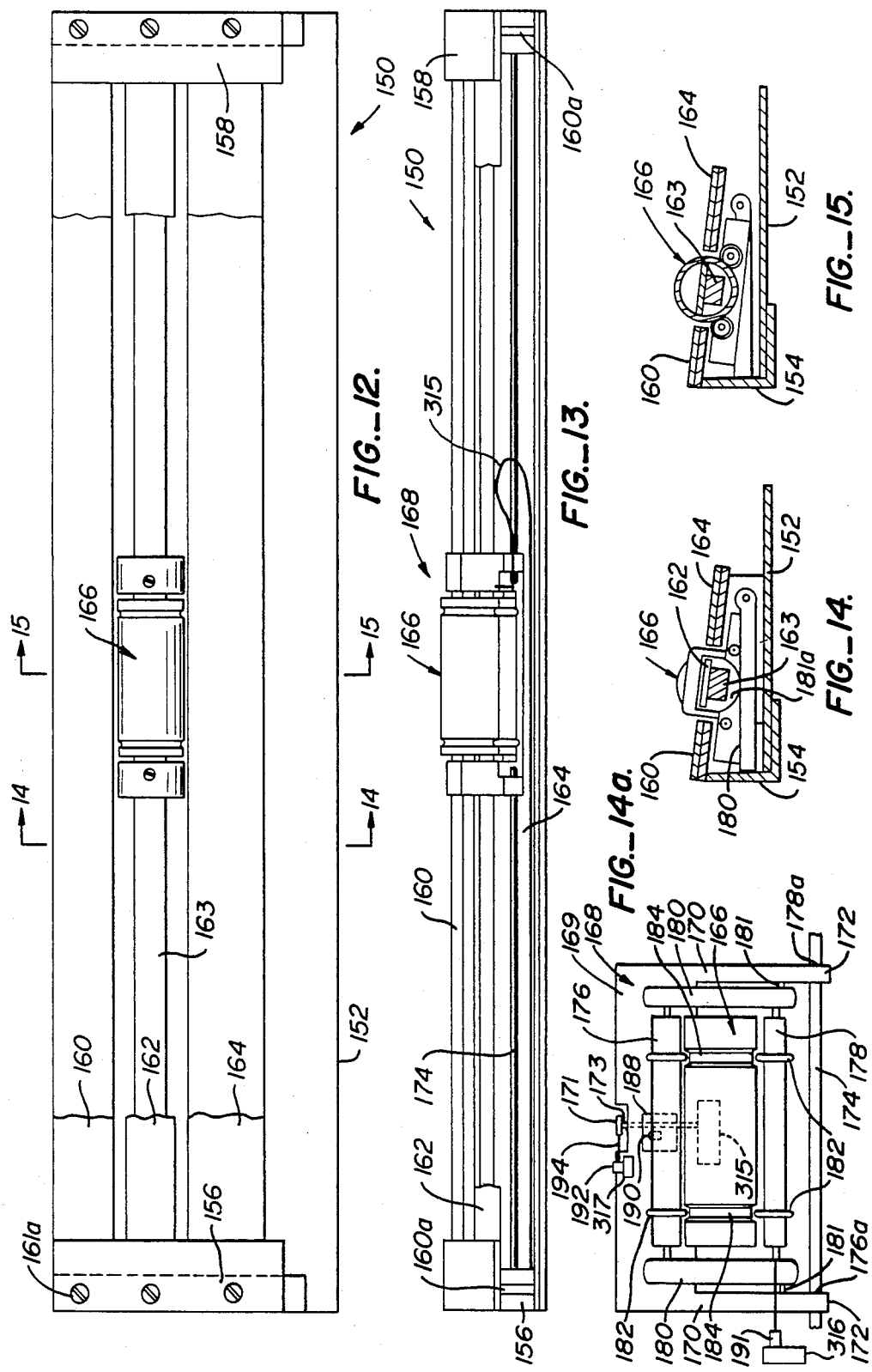

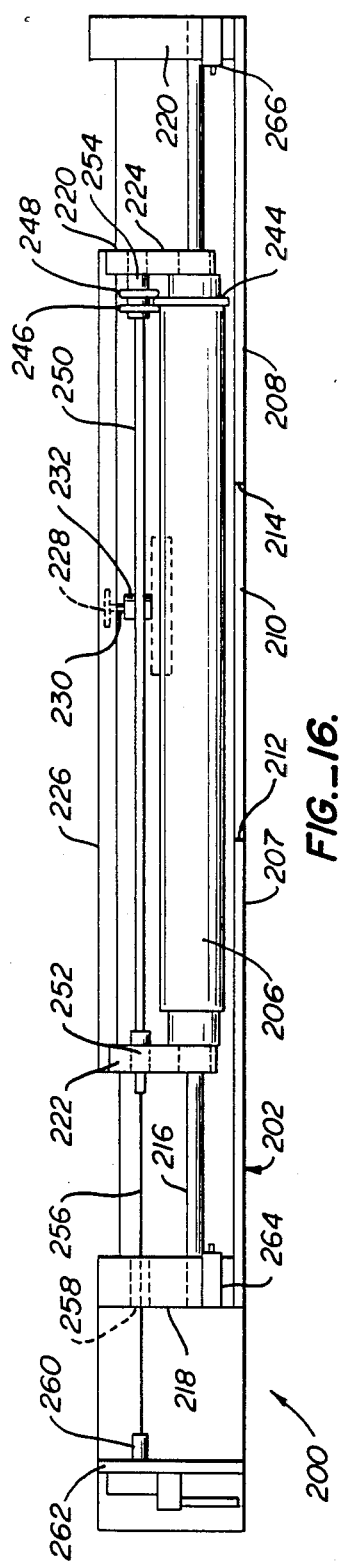
FIG._16.
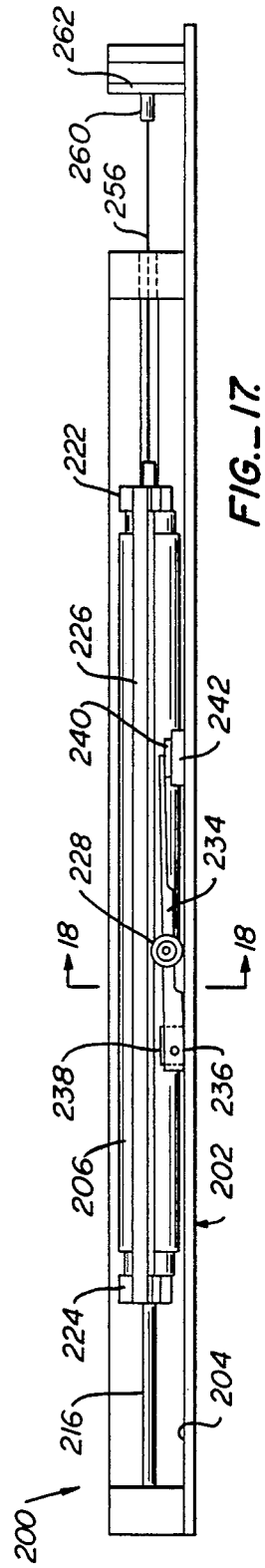
FIG._17.
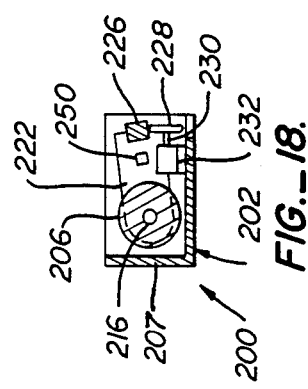
FIG._18.

CONTROL MECHANISM FOR COMPUTER KEYBOARD AND THE LIKE

This invention relates to improvements in accessories for computer keyboards and other electrical apparatus capable of being controlled by several electrical or other variables and, more particularly, to a control mechanism having a number of different uses, such as for controlling the mouse inputs of a computer.

RELATED APPLICATION

This application relates to an earlier application of applicant, Ser. No. 06/677,703, filed Dec. 4, 1984.

BACKGROUND OF THE INVENTION

It is well known to use a hand-engageable mouse with a computer keyboard for moving a pointer or cursor on the CRT display of a computer into various positions on the display for one or more purposes. It has also been known to substitute for the mouse a control mechanism which is used adjacent to the keyboard of the computer for effecting changes in cursor positions by manipulation of movable parts by the fingers or palm of the hand while the fingers of the hand remain on the keys of the computer keyboard.

In such a control mechanism, control over vertical and horizontal movements of the cursor on a computer display is achieved by the use of a rotatable shaft and a freely slidable member on the shaft. The member is coupled to the shaft so that the member rotates with the shaft yet the member can be shifted longitudinally of the shaft while the shaft is stationary or while the shaft is being rotated.

A first analog value is adjusted by rotation of the shaft and the member together in either of a pair of opposed directions. A second analog value is adjusted by moving the member along the shaft in either direction. Also, the mechanism can be constructed so that, with a slight downward pressure on the shaft or the member, an electrical switch can be actuated for enabling a circuit of the apparatus with which the mechanism is associated. Such a control mechanism of the type described above is disclosed in U.S. patent application Ser. No. 677,703, filed Dec. 4, 1984.

While the control mechanism described above is suitable for a number of applications, such a mechanism can be simplified so that a control mechanism can be constructed with fewer moving parts yet the simplified control mechanism can provide precision control of a pair of analog values, such as the X-Y position of the cursor of a computer display. The present invention provides such a simplified mechanism.

SUMMARY OF THE INVENTION

The present invention is directed to an improved control mechanism in which an analog element is mounted on a stationary guide member for rotation about the guide member and for movement longitudinally of the guide member. The rotational and longitudinal movements of the analog element relative to the guide member are sensed by encoder means coupled to the analog element. The mechanism is simple and rugged in construction, can be made at a minimal cost and has a long operating life.

The mechanism of the present invention can be constructed in any one of several different embodiments, each embodiment providing for the analog element to be rotatable and longitudinally movable between a pair of spaced stops near the outer ends of the guide member. Each such embodiment can be provided with an electrical switch coupled with the analog element and responsive to downward pressure on the analog element. The mechanism of the present invention can be of a size so that it requires only a minimum of space and can be used as an accessory for any electrical apparatus capable of being controlled by several electrical or other values, such the X and Y positions of a cursor of a CRT display.

The primary object of the present invention is to provide an improved control mechanism for use as an accessory of an electrical apparatus capable of being controlled by several electrical or other variables wherein the control mechanism includes an analog element coupled to encoding means and mounted for rotation and longitudinal movement on a stationary elongated guide member secured to a support so that the analog element can provide precision control of a first analog variable by rotation of the analog element about the guide member and precision control of a second analog variable by movement of the analog element along and relative to the guide member.

Other objects of this invention will become apparent as the following specification progresses, reference being had to the accompanying drawings for an illustration of the invention.

BRIEF DESCRIPTION OF THE DRAWINGS

FIG. 1 is a top plan view of a first embodiment of an improved control mechanism of the present invention;

FIG. 2 is a side elevational view of the control mechanism of FIG. 1;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2;

FIG. 5a is a schematic view of the control mechanism of FIGS. 1-5, showing its use as an accessory for a computer;

FIG. 6 is a top plan view of a second embodiment of the control mechanism of the present invention;

FIG. 7 is a side elevational view of the control mechanism of FIG. 6;

FIG. 8 is a cross-sectional view taken along line 8—8 of FIG. 6;

FIG. 9 is a cross-sectional view taken along line 9—9 of FIG. 6;

FIG. 10 is a fragmentary top plan view of the control mechanism of FIGS. 6 and 7 with the analog element thereof broken away and in section to reveal the mounting means therefor;

FIG. 10a is an enlarged, fragmentary top plan view of the mounting means for the analog element;

FIG. 11 is a view similar to FIG. 10 but showing the analog element and its mounting means from an angle 90° with respect to the view shown in FIG. 10;

FIG. 12 is a top plan view of a third embodiment of the control mechanism of the present invention;

FIG. 13 is a side elevational view of the control mechanism of FIG. 12;

FIG. 14 is a cross-sectional view taken along line 14—14 of FIG. 12;

FIG. 14a is a top plan view of the analog element of the embodiment of FIGS. 12 and 13, showing the mounting means for the analog element;

FIG. 15 is a cross-sectional view taken along line 15—15 of FIG. 13;

FIG. 16 is a top plan view of a fourth embodiment of the control mechanism;

FIG. 17 is a side elevational view taken along line 12—12 of FIG. 16; and

FIG. 18 is a cross sectional view taken along line 18—18 of FIG. 17.

A first embodiment of the control mechanism of the present invention is broadly denoted by the numeral 10 and is shown in FIGS. 1-5. Control mechanism 10, for purposes of illustration, is shown in FIG. 5a as being used as an accessory with a computer keyboard 12 coupled with a computer 14 having a display 16 thereon. Mechanism 10 is located adjacent to the lower or front end of the keyboard but it could be at any location which is convenient for one of the hands of the computer user. In such a position, mechanism 10 can be operated by the fingers, thumb or palm of either hand. When operated with the thumb or palm of the hand, mechanism 10 permits the fingers of both hands to be substantially free to manipulate the keys of keyboard 12.

When used with a computer, the present invention will typically be coupled to the mouse inputs of the computer. However, the invention can be used as a means to control variable or analog values associated with other types of apparatus, such as a video game controller, a bass-treble integrated tone controller or a left-right balance-volume control.

Mechanism 10 provides a precise and convenient means for adjustment of two related or distinct analog electrical or other values or parameters. When coupled with the mouse inputs of computer 14, mechanism 10 operates as a mouse for controlling the positions and movements of a mouse-driven pointer or cursor on the display of the computer. The way in which the signals are adjusted by use of mechanism 10 to cause the cursor to move in an X-Y plane on the display will be set forth hereinafter.

Mechanism 10 includes a support in the form of an elongated base plate 18 having a flange 20 integral therewith at the elongated side margin thereof remote from the keyboard 12 as shown in FIG. 5a. Mechanism 10 further includes a cylindrical guide member 22 which is located adjacent to flange 20 above base plate 18 as shown in FIGS. 3-5. The ends of guide member 22 are secured by screws 24 and 26 to rigid walls 28 and 30, respectively, walls 28 and 30 being secured in any suitable manner to base plate 18, such as by screws extending upwardly from the bottom of the base plate. Guide member 22 is adapted to support a cylindrical analog element 32 in a manner such that the analog element 32 can move longitudinally of and be rotatable on guide member 22. Element 32 has annular grooves 34 therein for enhancing the frictional contact of the analog element by the hand when mechanism 10 is in use.

Element 32 has an annular groove 36 at one end thereof which frictionally receives an O-ring 38 on a follower 40 which is slidably mounted on a rod 42 rotatably mounted at its ends thereof in bearings 44 and 46 carried by mounting blocks 48 and 50 rigidly secured to the upper surface of base plate 18 in any suitable manner, such as by screws or the like. Rod 42 is provided with a square cross section as shown in FIG. 4 and follower 40 has a transversely square passage therethrough so that follower 40 is complementally mounted on rod 42. Thus, as analog element 32 is rotated about guide member 22, follower 40 rotates with analog element 32 to, in turn, cause rotation of rod 42 relative to base plate 18.

A rigid cable 50 (FIGS. 1 and 2) is rigidly secured to the end of rod 42 near mounting block 48, and cable 50 is secured to a short shaft 52 coupled at its outer end to the rotatable part 54 of an encoder 56, such as a potentiometer, which is secured in any suitable manner to the upper surface of base plate 18. Thus, as analog element 32 is rotated in either direction about the longitudinal axis of guide member 22, such rotational movement is transmitted through follower 40 and rod 42 to part 54 of encoder 56. This encoder will, for instance, be coupled to one of a pair of mouse inputs.

A second encoder 58 is carried on the upper surface of base plate 18 near encoder 56 as shown in FIGS. 1 and 2. Encoder 58 has a rotatable part 60 coupled to a shaft 62 provided at its outer end with a first pulley 64 on a mounting block 65. A flexible cable or string 66 is mounted on pulley 64 and string 66 is coupled to a rigid, U-shaped pin 68 which is slidably received within an annular groove 70 in the outer surface of follower 40. The string is coupled at its ends to a coil spring 71 which provides tension for the string, the opposite end of the string being wrapped around a second pulley 72 rotatably mounted in any suitable manner on a mounting block 74 secured to the upper surface of base plate 18. For purposes of guiding spring 71 as it moves with string 70, a rod 76 is rigidly secured at its ends to a mounting block 80 and to mounting block 74. The spring is mounted on rod 76 and is movable along the same.

A transversely square rod 82 is adjacent to and extends longitudinally of guide member 22. Rod 82 is rotatably mounted by end flanges 84 and 86 on respective ends of guide member 22. A pair of hand-engageable pads 88 and 90 are secured by screws 92 and 94 to the ends of rod 82, and parts of pads 88 and 90 overlie respective ends of the guide member. Rod 82 has a pin 92 (FIG. 2) near pad 90, and the lower end of pin 92 is adapted to engage and actuate the shiftable part 94 of a microswitch 96 secured to the upper surface of member 18. Thus, switch 96 can provide an on-off or other capability for mechanism 10, and such on-off actuation of the switch can be achieved by rotating rod 82 downwardly by the actuation of the rod by pressing downwardly on either of pads 88 and 90 by the palm or other part of the hand.

To the illustrate the operation of mechanism 10, the mechanism will be discussed as being used with a keyboard 12 of a computer 14 of FIG. 5a. Encoders 56 and 58 will be coupled to the mouse inputs of the computer, and the mechanism 10 will be adjacent to the keyboard in some suitable location. In such position, analog element 32 can be engaged by the fingers, thumb or palm of one hand and element 32 can be not only shifted longitudinally of guide member 22 but rotated about the longitudinal axis of the guide member.

For moving the cursor on the display of the computer in an X direction, analog element 32 is shifted longitudinally of guide member 22. For moving the cursor in a Y direction, the analog element 32 is rotated about the longitudinal axis of guide member 22. Both rectilinear and rotational movements of member 32 can be done simultaneously so as to move the cursor on the computer display in a diagonal direction. During the operation of mechanism 10, switch 96 can be actuated to provide an on-off or other function for a computer 14 as desired or deemed necessary.

A second embodiment of the control mechanism of the present invention is broadly denoted by the numeral 110 and is shown in FIGS. 6-11. Mechanism 110 includes a support 112 comprised of a first L-shaped bar 114 (FIGS. 6, 8 and 10) which is secured by a pair of short, rigid members 116 to a second L-shaped bar 118, bar 118 being inverted with respect to bar 114 as shown in FIGS. 8 and 9. An elongated guide member 120 is secured by fasteners 122 to members 116 so that guide member 120 extends longitudinally of L-shaped members 114 and 118.

Guide member 120 is of a one-piece construction, typically a non-conductive plastic, such as polycarbonate. Guide member 120 has a flat upper surface 123 which extends between a pair of cylindrical end parts 124 having end faces 125 which serve as stops for a movable analog element 134. The cross section of the main portion of guide member 120 is semi-cylindrical as shown in FIG. 9.

A wheeled truck or shiftable device 126 is movable along upper surface 123 of guide member 120. The truck includes a rigid bar-like body 128 provided with first wheels at four locations thereon in rolling relationship to the upper surface 123 of guide member 120. Body 128 has a second wheel 132 thereon at each end thereof, respectively, for rotation about an axis perpendicular to the axes of first wheels 130. The axis of the second wheels is spaced above the axes of first wheels 130 as shown in FIG. 11.

Analog element 134 is tubular and cylindrical in shape and is in surrounding relationship to guide member 120. As shown in FIGS. 9 and 11, analog element 134 is rotatable relative to guide member 120 about the central axis of analog element 134 while at the same time, analog element 134 can move with truck 126 longitudinally of guide member 120.

Truck 126 has end plates 136 which are releasably coupled, such as by screws, to the end faces of body 128. To releasably couple analog element 134 to truck 126 so as to prevent the truck from moving out of the interior of analog element 134, one of the second wheels 132 is mounted in a U-shaped bracket 133 (FIG. 10a.) pivotally mounted by pins 135 in a recess 139 on body 128. A set screw 137 is threadably mounted in the side of body 128 and has an inner end in recess 139 which bears against bracket 133 when the corresponding wheel 132 is in the operative position thereof shown in FIG. 11. The bracket 133 is shown in FIG. 10a in its position pivoted away away from screw 137 before truck 126 is placed in analog element 134; however, if the bracket 133 is pivoted about pins 135 until the bracket engages the adjacent end of the screw 137, the screw will be able to adjust the effective height of the wheel 132 relative to flat surface 123 of guide member 120. A screw driver can be inserted into a hole 139 (FIG. 10a) in element 134 so as to tighten screw 137 so that the adjacent second wheel 132 will frictionally engage the inner surface of guide element 134 so as to effectively couple element 134 to truck 126 while allowing rotation of analog element 134 relative to guide member 120.

Element 134 can be operatively connected to a first encoder (not shown) so that the encoder will be actuated when analog element 134 is rotated in either direction about guide member 120. For instance, analog element 134 could be coupled to an encoder, such as encoder 56 of FIG. 1, by way of a means, such as follower 40, shaft 42 and cable 50 as discussed above with respect to control mechanism 10. Truck 126 can be coupled to a second encoder (not shown) in any suitable manner, such as by cable and pulley means of the type disclosed above with respect to the control mechanism 10 and as shown in FIGS. 1 and 2.

FIGS. 6, 9 and 11 show the connection system between the analog element 134 and a rotary encoder 309 as was shown in the first embodiment. A thin bar 306 is affixed to one end plate 136 (as shown in FIGS. 9 and 10) of the truck 126. As shown in FIG. 9, the bar 306 projects through the opening 304 between analog element 134 and L-shaped bar 118, and also projects under L-shaped bar 118. An encoder 309 (shown schematically) is mounted at the left end of the support 110 and a pulley 308 is mounted at the right end of the support structure. Attached between the pulley 308 and the rotatable shaft 305 of the encoder 309 is a flexible cable 307 as shown in FIG. 6. Flexible cable 307 is attached to bar 306. In this way the lateral movement of analog element 134 is transferred to the cable loop 307 thereby causing the shaft 305 of encoder 309 to rotate as shown by arrows in FIG. 9. Thus, encoder 309 senses lateral movement of the analog element 134.

Rotary movement of the analog element 134 is detected in a like manner as described in the first embodiment. A groove 310 is formed as shown in FIG. 9 into the bottom of the support member 120 (FIGS. 6, 9 and 11). In the groove 310 is mounted a shaft 311 having a square cross section. At the left end of the support member 120, the shaft 311 is carried in a bearing (not shown). At the right end of the support member 120, the shaft 311 is connected to the shaft 320 of a rotary encoder 312, shown in FIG. 11. Resilient O-rings 314 (FIG. 11) are mounted on each end of a tube 313. Tube 313 has a square internal cross-section which surrounds and slidably engages and rotates with transversely square shaft 311. The O-rings 314 frictionally engage with the inner surface of the cylinder 134 with sufficient pressure such that any rotation of cylinder 134 causes the O-rings 314 to rotate. The O-rings 314 transfer their rotation to tube 313 and shaft 311, thereby turning the shaft 320 of the encoder 312. Thus, tube 313 and cylinder 134 can slide along shaft 311 in the event of lateral movement of the analog member 134, but always transfer any rotation of the analog member 134 to the encoder 312.

In use, control mechanism 110 is operated such that the rotation of analog element 134 about its central axis will cause upward or downward or Y movements of a cursor on a computer display. Left and right or X movements of the cursor are caused when truck 126 as well as analog element 134 move along surface 123 of guide member 120. End faces 124a of end parts 124 of guide member 120 define stops which limit the travel of truck 126 and element 134 in either direction.

A third embodiment of the present invention is broadly denoted by the numeral 150 and is illustrated in FIGS. 12-15. Control mechanism 150 includes support in the form of a base plate 152 (FIGS. 14 and 15) and an L-shaped bracket 154 secured to and extending longitudinally of one side margin of base plate 152. A pair of end plates 156 and 158 are secured by screws (not shown) to the upper surface of base plate 152 near respective ends thereof. Each of the end plates 156 and 158 has an inclined upper face for mounting three parallel, spaced, electrically non-conductive, generally rigid strips 160, 162 and 164 by screws (not shown). Each of the plastic strips 160, 162 and 164 has a metal bar therebeneath for support purposes.

A cylindrical analog element 166 is mounted for rotation about central strip 162 and also for movement longitudinally of such strip. To this end, a shiftable carriage 168 (FIG. 14a.) has a pair of side members 170 which are shiftably coupled at first ends thereof to a rigid rod 174 spanning the distance between a pair of mounting blocks 176 and 178 secured in any suitable manner to base plate 152. A pair of spaced, parallel, cylindrical rollers 176 and 178 are journaled for rotation in a pair of side bars 180 which are hingedly mounted by pins 181 to the adjacent side members 170 of carriage 168. Rollers 176 and 178 each have two resilient O-rings 182 thereon which seat in a pair of annular grooves 184 in the outer surface of analog element 166. As shown in FIG. 14, each of side bars 180 has a cut-out portion to clear the lower metallic bar 163 attached to the lower surface of bar 162.

Carriage 168 has a plate 169 provided with a notch at one side edge thereof in which is located a wheel 171 mounted on a shaft 173. Wheel 171 is adapted to engage the upper surface of base plate 152; thus, carriage 168 is supported at one margin by wheel 171 and at the opposite margin by rod 174 (FIG. 14a).

A microswitch 188 is secured to the upper surface of plate 169 of carriage 168. Microswitch 188 has a shiftable part 190 which is in a position to be engaged by roller 176 to cause an on-off or other function when desired merely by pressing downwardly on analog element 166, whereupon side bars 180 pivot downwardly and cause roller 176 to engage shiftable part 190 and to force the latter downwardly. The switch has a normal upward bias on shiftable part 190; thus, the normal position of the shiftable part is up and it thereby biases roller 176 upwardly.

A pair of encoders are provided to sense the rotational and longitudinal movements of analog element 166 relative to strip 162. Thus, a rotary encoder could be coupled to, for instance, roller 176 to sense the rotational movements of analog element 166 in either direction about strip 162 relative to base plate 152. Similarly, carriage 168 could be coupled, such as by cable and pulley means of the type shown in FIGS. 1 and 2, to a second encoder.

For example, in the embodiment shown in FIGS. 12–15, the encoders 316 and 317 are mounted on the laterally movable assembly 168 supporting the cylindrical analog element 166. Electrical connection between the encoders 316, 317 and the base plate 152 is made through a flexible ribbon multiconductor 315, shown in FIG. 13, which lies on the base plate 152 (FIGS. 14 and 15) of the device and doubles back to join with the carriage 168 (FIG. 13). The encoder 316 (FIG. 14a) for sensing rotary motion of element 166 is mounted at the end of cylindrical roller 178. Rotation of the analog element 166 causes proportional rotation of cylindrical roller 178, which turns the shaft 190 of the rotary encoder 316. The shaft 192 (FIG. 14 a) of the linear movement encoder 317 is rotatably coupled with the wheel 171 by means of a belt or pulley 194. Thus, any lateral movement of the moving assembly 168 causes wheel 171 to rotate, which in turn rotates the shaft of the encoder 317.

A fourth embodiment of the present invention is broadly denoted by the numeral 200 and includes a plate-like support 202 which has an upper surface 204 over which a cylindrical member 206 can move and can rotate with respect to plate 202. A pair of upright walls 207 and 208 are integral with plate 202 and present a gap 210 therebetween, the gap being defined by the end faces 212 and 214 of walls 207 and 208. The purpose of the gap 210 is to provide access to cylindrical member 206 for the fingers or palm of one hand of the user when, for instance, the apparatus 200 is associated with the keyboard of a computer or the like.

Member 206 is mounted for translation on a rod-like shaft 216 which is secured at its ends to a pair of end blocks 218 and 220 rigidly secured to and extending upwardly from the upper surface 204 of plate 202. Member 206 is also rotatably mounted on shaft 216 and the shaft forms part of a frame broadly denoted by the numeral 220, frame 220 including end blocks 222 and 224 mounted for sliding movement along shaft 216, member 206 being rotatable relative to end blocks 222 and 224. A rigid elongated rod 226 forms a part of frame 220 and is rigidly secured at its ends to blocks 222 and 224. Frame 220 is rotatable about the central axis of shaft 216 and in its normal position, the frame is shown in FIGS. 1–3 as in frictional engagement with a wheel 228 having a shaft 230 coupled to a encoder 232 which is in the form of a rotary potentiometer. The potentiometer is mounted in any suitable manner on the plate 202, such as by an arm 234 pivotally mounted about a pin 236 on a block 238 rigid to upper surface 204 and plate 202. The outer end of the arm 234 has a projection 240 for actuating a microswitch 242 which has on-off capability in some circuit associated with potentiometer 232. In the event that wheel 228 is carried by arm 234 instead of being rotatably mounted on plate 202 itself, potentiometer 232 will be carried by the arm 234 as well. Thus, translational or linear movement of frame 220 and thereby cylindrical member 206 will be sensed by the rotation of wheel 228 and thereby the actuation of potentiometer 232. The direction of rotation can also be sensed to provide a polarity indication.

Member 206 has an O-ring 244 (FIG. 16) thereon which frictionally engages a pair of O-rings 246 and 248 on a rod 250 which is tubular and is rotatably mounted on blocks 222 and 224 by bearings 252 and 254. Since the rod 250 is tubular, it can receive a rigid wire-like element 256 in a manner such that the wire 256 is stationary as to translation but is rotatable with rod 250 relative to plate 202. The wire-like element 256 extends through a hole 258 in block 218 and is coupled to the rotatable shaft 260 of a second encoder 262 which is typically in the form of a rotary potentiometer. Thus, rotation of member 206 will be sensed by the rotation of rod 250 whose rotation will be, in turn, sensed by potentiometer 262.

A pair of limit switches 264 and 266 can be mounted on block 218 and 220, respectively (FIG. 16). These limit switches are in the path of movement of blocks 222 and 224 or frame 220 so as to be engaged by respective blocks when the left- and right-hand limits of travel of frame 220 have been reached.

In use, the encoders 232 and 262 can be coupled to the mouse inputs of a computer and apparatus 200 can be adjacent to the keyboard of the computer or spaced from the keyboard, if desired. By translating or moving member 206 in a rectilinear path along shaft 216, encoder 232 will be actuated by virtue of the frictional engagement between wheel 228 and rod 226. Upon rotation of member 206 relative to and about shaft 216, encoder 262 is actuated by virtue of the rotation of rod 250 relative to box 222 and 224 under the influence of the rotation of member 206. As rod 250 rotates, wirelike element 256 also rotates with rod 250 yet it is to be understood that translation or rectilinear movement of rod 250 relative to plate 202 does not translate or move element 256 longitudinally of shaft 216 and relative to plate 202.

I claim:

1. A control mechanism comprising:
   a support including an elongated guide member;
   a hand manipulatable analog element mounted on said support guide members said element being movable in both rotation and linear movement relative to said support; and
   encoding means carried by the support and coupled with said analog element for sensing both the rotation of the analog element relative to said support and linear movement of the analog element relative to said support.

2. A mechanism as set forth in claim 1, wherein said guide member being cylindrical, said analog element being tubular and rotatably and linearly movable on said guide member.

3. A mechanism as set forth in claim 1, wherein said guide member having a substantially flat upper surface, said analog element being tubular and in surrounding relationship to said guide member, there being means between the upper surface of the guide member and the inner surface of the analog element for mounting the analog element for rotation on the guide member and for mounting the analog member on the guide member for linear movement along said upper surface thereof.

4. A mechanism as set forth in claim 3, wherein said mounting means includes a truck having first wheel means for engaging the upper surface of the guide member and second wheel means for engaging the inner surface of the analog element.

5. A mechanism as set forth in claim 4, wherein said truck includes a body having a pair of opposed sides, said first wheel means including a number of first wheels rotatably carried by the body at the sides thereof in rolling relationship to said upper surface of the guide member, said second wheel means including a pair of spaced second wheels rotatably mounted on the body about an axis vertically spaced from the axes of the first wheels and extending longitudinally of said guide member, said second wheels being in rolling relationship to the inner surface of the analog element.

6. A mechanism as set forth in claim 5, wherein one of the second wheels has means shiftably coupling the same on the body, and means engageable with said coupling means for adjusting the pressure exerted by one second wheel against the analog element to effectively couple the second wheels to the analog element.

7. A mechanism as set forth in claim 3, wherein is included means defining a pair of stops for the analog element at respective ends of the guide member.

8. A mechanism as set forth in claim 3, wherein said support has flat surface means thereon extending longitudinally of said guide member for providing support surfaces for the hand.

9. A mechanism as set forth in claim 1, wherein said support includes a base plate, said guide member including a flat, relatively rigid central strip secured at the ends thereof to said base plate, there being a pair of flat, rigid strips secured to the base plate on opposite sides of, spaced from, and parallel to the central strip, said analog element being movable along said central strip and between the side strips.

10. A mechanism as set forth in claim 9, said strips being spaced above said base plate, the upper surfaces of the strips being substantially in a common, inclined plane, there being means mounting the analog element on the base plate with the element projecting outwardly from the plane of the upper surfaces of said strips.

11. A mechanism as set forth in claim 9, wherein is included a carriage having wheel means at one margin thereof for engaging the base plate in rolling relationship thereto, there being a guide rod secured to the base plate and coupled to the carriage at the opposite margin thereof, a pair of rollers rotatably mounted to the carriage and extending longitudinally of the guide member, said analog element being a tubular device rotatably supported on said rollers in surrounding relationship to the guide member.

12. A mechanism as set forth in claim 11, wherein each of the rollers has a pair of spaced, resilient O-rings thereon, said analog element having a pair of annular grooves for receiving the O-rings of said rollers in rolling relationship thereto.

13. A mechanism as set forth in claim 12, wherein is included a switch on said carriage, said switch having a shiftable part, the microswitch being in vertical alignment with one of said rollers, and including a pair of side arms pivotally mounted at first ends thereof on said carriage, said one roller being rotatably mounted at the ends thereof on second ends of said side arms, said one roller being movable against the shiftable part of the switch for actuating the switch when said one roller is pivoted about said axis under the influence of downward pressure exerted on said analog element.

14. A mechanism as set forth in claim 1, wherein said encoder means includes a pair of encoders carried by the support, first means coupling the analog element to one of the encoders for actuating the latter in response to the rotation of the analog element, and second means coupled with the second encoder for actuating the same in response to the translation of the analog element, relative to said support.

15. A mechanism as set forth in claim 14, wherein said first means includes a rod rotatably mounted at its ends on the support, and a follower movable longitudinally of the rod, said follower having a resilient O-ring mounted thereon in surrounding relationship to the rod, said O-ring being frictionally engageable with the analog element for rotating the follower and thereby the rod in response to the rotation of the analog element relative to the support.

16. A mechanism as set forth in claim 15, wherein said second means includes a cable and pulley assembly mounted on said support and a coupling device secured to the cable of said assembly for movement therewith, said coupling device being rotatably connected to said follower for movement therewith longitudinally of the rod, said assembly being coupled t the second encoder.

17. A mechanism as set forth in claim 14, wherein said second means includes a cable and pulley assembly coupled with said analog element, the cable of said assembly being movable with said analog element relative to said support, said cable being coupled with said second encoder.

18. A mechanism as set forth in claim 1, wherein is included a switch carried by the support and having a shiftable part, and means mounted on the support for actuating the switch.

19. A mechanism as set forth in claim 18, wherein said actuating means including a rod pivotally secured at its ends thereof on said support for rotation about the longitudinal axis of the guide member, said rod being adjacent to and extending longitudinally of the guide member, there being a hand-engageable pad mounted on the rod, said rod being coupled to the switch for actuating the same when the rod is pivoted in one direction relative to the guide member, said switch having means for biasing the rod in the opposite direction.

20. A control mechanism comprising:

a support including an elongated guide member;

a hand manipulatable device mounted on the support guide member said device being movable in both rotation and linear movement in a linear direction relative to the support;

means coupled with the device for adjusting the value of a first signal as a function of the rotation of the device relative to the support; and means coupled with the device for adjusting the value of a second signal as a function of the movement of the device in said linear direction relative to the support.

21. A mechanism as set forth in claim 20, wherein said support includes a fixed shaft, said device including a control member rotatably mounted on an movable along the shaft.

22. A mechanism as set forth in claim 21, wherein said control member comprises a cylinder surrounding the shaft.

* * * * *

UNITED STATES PATENT AND TRADEMARK OFFICE
CERTIFICATE OF CORRECTION

PATENT NO. : 4,724,715
DATED : February 16, 1988
INVENTOR(S) : Craig F. Culver

It is certified that error appears in the above-identified patent and that said Letters Patent is hereby corrected as shown below:

Col. 5, line 52, delete one "away".

Col. 7, line 59, "190" should read --191--.

Col. 9, line 12, "members" should read --member,--.

Col. 10, line 58, "t" should read --to--.

Col. 11, line 17, after "member" insert a comma.

Col. 12, line 12, "an" should read --and--.

Signed and Sealed this

Twenty-eighth Day of February, 1989

Attest:

DONALD J. QUIGG

Attesting Officer

Commissioner of Patents and Trademarks